United States Patent [19]
Führer

[11] 3,902,408
[45] Sept. 2, 1975

[54] APPARATUS FOR PREPARING HOT BEVERAGES

[75] Inventor: Hubert Führer, Solingen, Germany

[73] Assignee: Robert Krups, Solingen-Wald, Germany

[22] Filed: Nov. 21, 1973

[21] Appl. No.: 418,095

[30] Foreign Application Priority Data
Dec. 1, 1972 Germany............................ 2258897

[52] U.S. Cl. ................................................. 99/307
[51] Int. Cl.[2] ..................... A23F 1/08; A47J 31/057
[58] Field of Search ............ 99/288, 304, 305, 306, 99/307, 311, 279

[56] References Cited
UNITED STATES PATENTS
| | | | |
|---|---|---|---|
| 3,592,125 | 7/1971 | Tolmie................................. | 99/307 |
| 3,691,934 | 9/1972 | Horn..................................... | 99/307 |

*Primary Examiner*—Robert W. Jenkins
*Assistant Examiner*—Arthur O. Henderson
*Attorney, Agent, or Firm*—Michael S. Striker

[57] ABSTRACT

An apparatus for preparing hot beverages comprises a flow-through heater provided with a substantially horizontal channel having an inlet portion communicating with a storage chamber for unheated liquid and an outlet portion communicating with an upright rising conduit for conducting hot liquid to a percolator. A one way valve is interposed between the storage chamber and the inlet portion of the channel so as to separate the former from the latter when the pressure in the inlet portion exceeds the pressure in the storage chamber. The inlet portion is located at a higher level than the outlet portion so that steam generated in the inlet portion during heating of the liquid in the flow-through heater forms a steam cushion acting on the surface of the liquid contained in the inlet portion, forcing the heated liquid through the outlet portion and the rising conduit into the percolator without any entrainment of the steam in the flow of the liquid, with attendant improved uniformity of flow.

13 Claims, 6 Drawing Figures

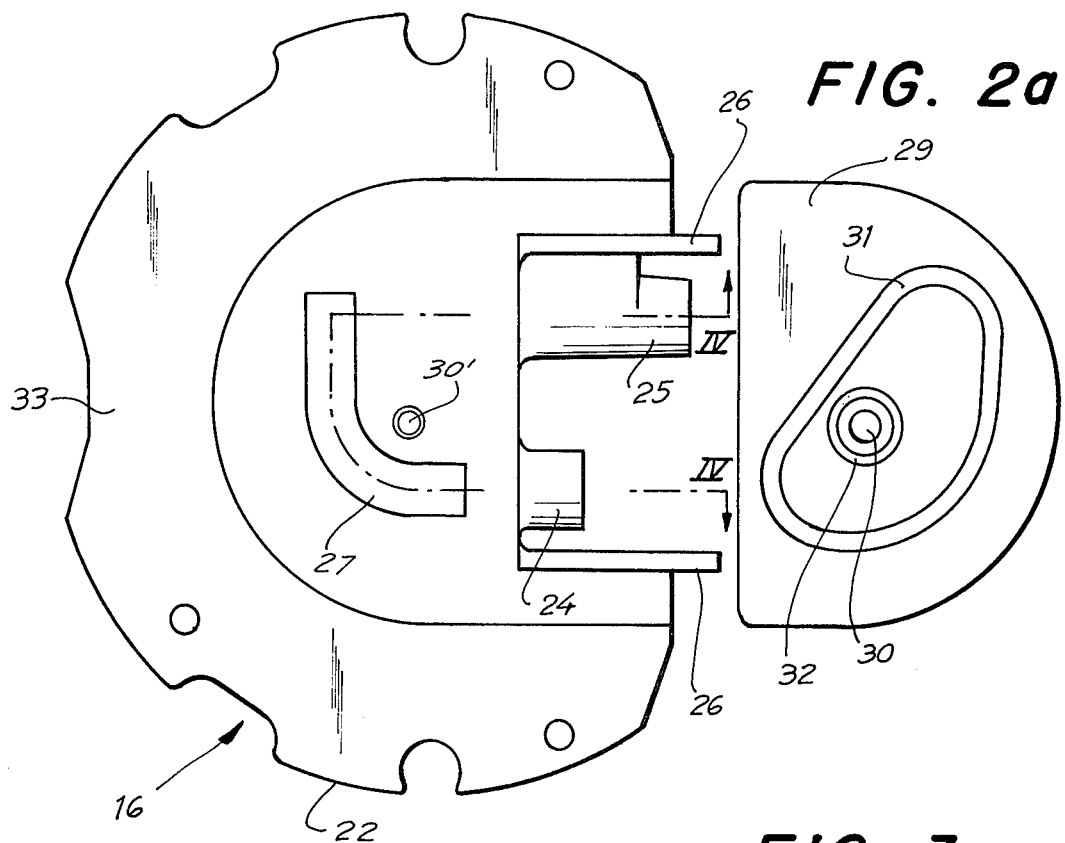
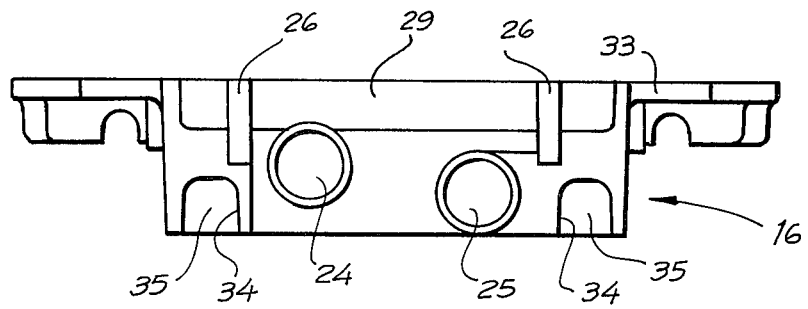
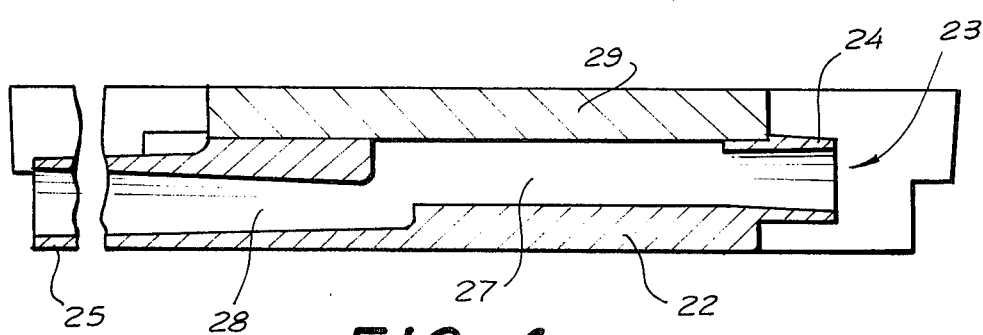

APPARATUS FOR PREPARING HOT BEVERAGES

BACKGROUND OF THE INVENTION

The present invention relates to an apparatus for preparing hot beverages such as coffee or tea. More particularly, the present invention relates to an improved flow-through heater to be used in such an apparatus.

There are already known various apparatuses for preparing hot beverages in which unheated liquid is stored in a storage chamber or vessel and in which such liquid is being heated as it passes through a flow-through heater, the hot liquid exiting from such heater being conducted by an upright rising conduit to a percolator of a drip-through type in which the hot liquid contacts the substance to be extracted. It is also already known to provide the flow-through heater with a channel in which the liquid is being heated with attendant generation of steam at elevated pressure which forces the liquid through the channel and the rising conduit toward the percolator. Experience has shown that such apparatuses are possessed of a serious drawback, in that the flow pattern of the liquid passing through the upright conduit suffers considerable variations due to the fact that the volume occupied by the steam varies in a considerable range as a result of non-uniform heating of the liquid flowing through the heater. Furthermore, a considerable portion of the steam generated in the channel is entrained by the liquid and proceeds concurrently therewith through the rising conduit to exit from the outlet opening of the rising conduit and escape into the ambient atmosphere. It is evident that, during the passage of the entrained steam through the outlet opening of the rising conduit, the flow of hot liquid therethrough is reduced so that the flow exiting from the outlet opening follows a very irregular pattern. As a result of this, the exiting hot liquid flow is very turbulent with attendant formation of hot liquid spray. Of course, this is very disadvantageous since, in addition to soiling of the apparatus itself and its environs, the danger of the user of the apparatus coming into contact with hot liquid droplets with attendant burns or scaldings cannot be avoided. Some attempts have already been made to avoid these problems; however, these attempts have not yet resulted in a complete solution to the outstanding problem of prevention of spray effect at the outlet opening of the apparatus. In the heretofore known apparatuses including means for reducing the spray effect at the outlet opening, severe reduction of the outlet temperature of the liquid was the price for minute improvement in the uniformity of flow of the liquid emerging from the outlet opening.

SUMMARY OF THE INVENTION

It is an object of the present invention to avoid the drawbacks of the prior art apparatus.

More particularly, it is an object of the present invention to provide an improved flow-through heater to be used in an apparatus for producing hot beverages.

It is a further object of the present invention to provide an apparatus for producing hot beverages in which the flow of hot liquid emerging from the outlet opening of the apparatus is smooth and substantially continuous.

A still further object of the present invention is to provide an apparatus for producing hot beverages in which the temperature of the liquid emerging from the outlet opening of the apparatus approaches the boiling temperature.

In pursuance of these objects and others which will become apparent hereinafter, one of the features of the invention resides in providing a substantially horizontal channel in the flow-through heater, having an inlet portion communicating with a reservoir of unheated liquid and an outlet portion communicating with an upright rising conduit, wherein the inlet portion is at least partially located at a higher level than the outlet portion. Experience has shown that with such an arrangement, steam is generated and accumulates in the inlet portion of the channel which is located at a higher level than the outlet portion of the channel so that the pressure exerted by this steam on the surface of the liquid present in the inlet portion forces the liquid through the outlet portion into the rising conduit and out of the outlet opening thereof, without appreciable quantities of the steam being entrained in and carried by the hot liquid toward and out of the outlet opening. As a result of the absence of steam inclusions in the flow of liquid, the flow in the rising conduit is regular even though pulsating and, as a consequence thereof, the discharge of the hot fluid through the outlet opening and into the basket of the percolator is undisturbed.

According to a currently preferred embodiment, the offsetting of the levels at which the inlet and outlet portions of the channel are located, is in the heating region of the flow-through heater, so that the liquid is additionally heated during its passage through the outlet portion. In this manner, the liquid to be used for preparation of hot beverages can be heated in the channel of the flow-through heater, without disturbing the liquid flow, until its temperature almost reaches the boiling temperature of the liquid. This latter fact is of considerable significance since the quality of the hot beverage depends to a large extent on the temperature of the liquid used for its preparation.

In a currently preferred embodiment of the invention, the transition between the inlet portion and the outlet portion of the channel of the flow-through heater is step-wise, which prevents the entrainment of the steam by the liquid and its passage with the liquid from the inlet portion into the outlet portion of the channel and from there into the rising conduit, even under most severe conditions.

Experience has shown that best results in terms of optimum quantity and simultaneously high temperature of the hot liquid emerging from the outlet opening of the apparatus are achieved if the length of the outlet portion of the channel amounts to approximately 1.5 to 2 times the length of the inlet portion of the channel. It is also recommended that the length of the inlet portion of the channel amount to approximately 45 millimeters and the cross-sectional area thereof equals approximately 80 mm$^2$.

In a currently preferred embodiment, the channel is of a substantially U-shaped configuration which, aside from resulting in considerable improvement of available space utilization, also results in improved uniformity of heat transfer from the flow-through heater into the liquid being heated therein. If such is the case, then the flow-through heater has an inlet and an outlet nipple which point in the same direction, communicate with the inlet and the outlet portion of the channel respectively, and are connectable to a supply conduit for the unheated liquid and a conduit for hot liquid, such as the rising conduit. It is also currently preferred that the channel be formed directly in a body of the flow-through heater, the body being produced in a die-casting or injection-molding operation. Besides considerably simplifying the channel-formation operation, this arrangement obtains very good results in terms of heat transfer. In addition thereto, the arrangement of the channel directly in the body of the flow-through heater renders it possible to surround the channel with a relatively thick jacket of heat-conducting material which, due to its heat conduction and storage properties, assures uniform heat distribution into all regions of the channel even during the period of entrance of unheated liquid coming from the storage chamber into the inlet portion of the channel. In addition to providing the channel immediately in the body of the flow-through heater, it is also recommended that the nipples of the channel be laterally surrounded by projections of the body, so that the liquid is additionally heated also during its passage through the nipples.

In the currently preferred embodiment of the invention, the channel, or at least a portion thereof, is formed in the body of the flow-through heater so as to be open in a region thereof which, after the apparatus is assembled, faces upwardly, and the above-mentioned open region is subsequently closed by a closure. This arrangement renders possible exact machining of the inlet portion of the channel, which is of significant importance for a uniform formation of the steam region, and also cleaning of the channel of the flow-through heater after an extended operation of the apparatus. Advantageously, the closure is configurated as a closing plate covering the entire region of the body of the flow-through heater in which the channel is provided and, even more advantageously, a rim is provided on the body of the flow-through heater, which rim laterally defines a recess in the body, and the plate is configurated so as to exactly fit into this recess and to be attachable to the body of the flow-through heater. The advantage of this latter arrangement is that, despite the fact that the channel is surrounded by two distinct parts, that is the body of the heater and the covering plate, the heat transfer conditions between the parts surrounding the channel and the liquid contained in the channel are substantially uniform along the entire channel due to the relatively large surface contact area between the heater body and the covering plate. Central attachment of the covering plate to the body has been found to be most advantageous. In such a case, the upwardly open region of the channel is laterally surrounded by a sealing element which, when the heater body and the covering plate are assembled, prevents the liquid from escaping toward the rim of the body, and the region of attachment of the covering plate to the heater body is enclosed by a different sealing element which prevents the liquid from escaping through the attachment region. Preferably, the sealing is of deformable type, and it is integrated either into the covering plate or into the heater body so that it permits abutment of the covering plate against the heater body once the attachment is tightened. In order to insure uniform transfer of heat into the channel, it is currently preferred to make the covering plate at least 7 millimeters thick, so that the covering plate has a considerable heat storage capacity.

It is also possible, in order to increase the heat transfer, to provide a groove in the heater body and to locate a heating element therein in such a manner that the groove and the heating element accommodated therein are at least partially located at the same level as the channel, laterally surrounding the same. Furthermore, it is also possible to form the outlet portion of the channel in such a manner that it diverges in the direction toward the rising conduit, which produces an appreciable decrease in the resistance to flow of the liquid through the channel.

According to still another embodiment of the invention, a one-way valve is interposed between the storage chamber for the unheated liquid and the inlet nipple of the channel of the flow-through heater. The purpose of providing such a valve is to control the admission of unheated liquid from the storage chamber into the flow-through heater and to prevent return of the already heated liquid into the storage chamber even under the most disadvantageous conditions. In a currently preferred embodiment of the invention, the one-way valve is configurated as a disk valve comprising a valve disk opening toward the inlet nipple of the channel of the flow-through heater. Experience has shown that when such a disk valve is provided and arranged in a manner previously described, good sensitivity to the flow variations and thus good control capacity for the flow of the liquid through the flow-through heater are obtained. Finally, the valve seat member is preferably configurated as a tubular sleeve which is fittingly insertable into the conduit from the storage chamber to the inlet portion of the channel in the flow-through heater, and is provided with a slide bearing which is coaxial with the sleeve and which supports a stem of the valve member of the one-way valve. This arrangement results in a possibility to assemble the one-way valve prior to its insertion into the conduit between the storage chamber and the inlet portion of the channel.

The novel features which are considered characteristic for the invention are set forth in particular in the appended claims. The invention itself, however, both as to its construction and its method of operation, together with additional objects and advantages thereof, will best be understood from the following description of specific embodiments when read in conjunction with the accompanying drawing.

BRIEF DESCRIPTION OF THE DRAWINGS

FIG. 2 is a top plan view of a body of the flow-through heater used in the apparatus of FIG. 1;

FIG. 2a is a bottom view of a cover plate for the body of the flow-through heater as shown in FIG. 2;

FIG. 3 is a side elevational view of the body of the flow-through heater;

FIG. 4 is a developed cross-sectional view of the body of the flow-through heater taken at line IV—IV of FIG. 2.

Figure 1:
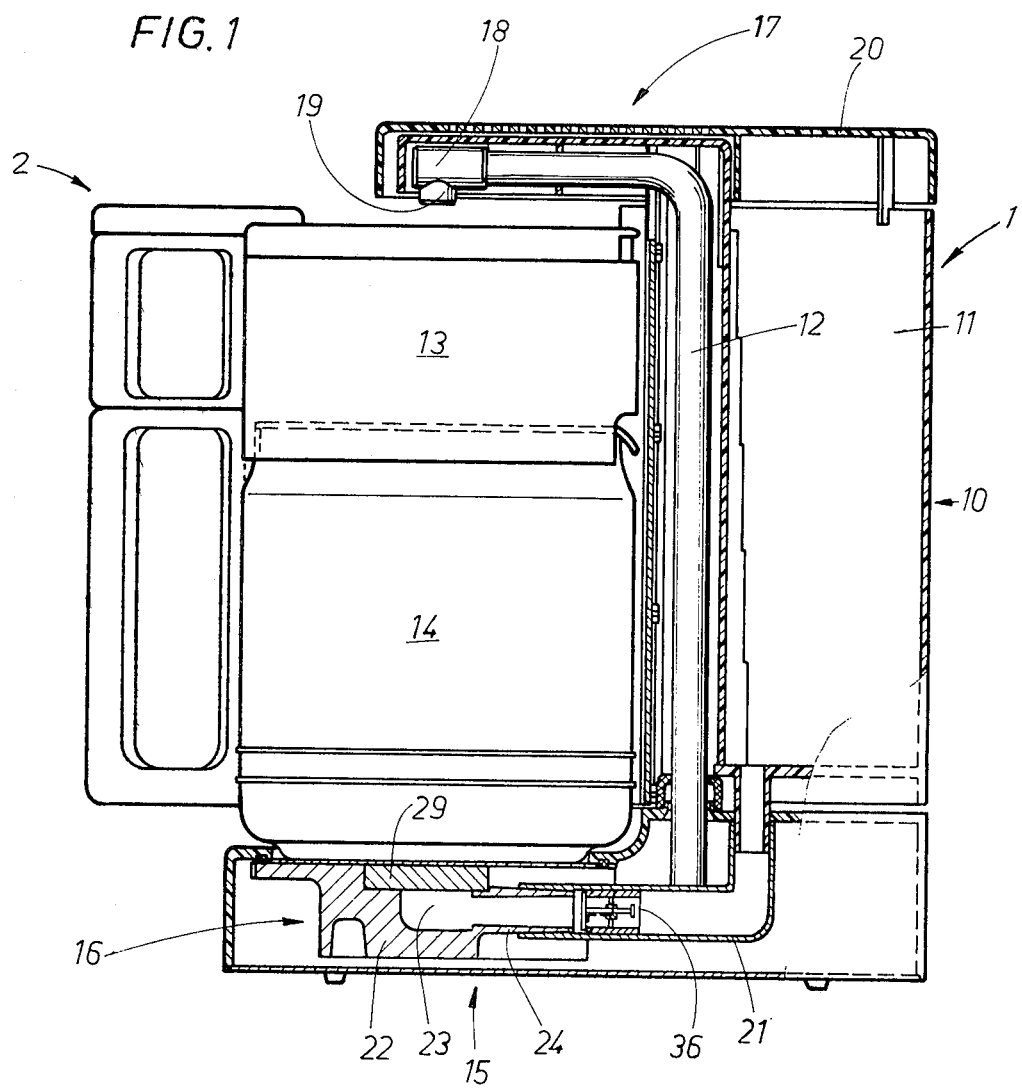
FIG. 1 is a partially sectioned side elevational view of a preferred embodiment of the apparatus according to the invention.

DESCRIPTION OF THE PREFERRED EMBODIMENTS:

FIG. 1 shows a currently preferred embodiment of an apparatus for producing hot beverages, comprising a heating unit 1 and a percolator 2 of the drip-through type. While the invention will be described as used in heating water in the heating unit 1 and forwarding hot water into the percolator 2 where it comes into contact with the substance from which flavor is to be extracted, such as coffee or tea, and the hot water enriched with flavor drips into a receptacle, it is to be understood that it would be equally possible to use this apparatus for warming-up of already flavored liquid. Similarly, it would also be possible to use the apparatus for producing hot water to be poured over instant coffee or tea extract.

The heating unit 1, which will be described as used in preparation of hot coffee, is in a known manner of a substantially C-shaped configuration, comprising a columnar main portion 10 defining a storage chamber or compartment 11 for the unheated liquid, and a rising conduit 12 for forwarding liquid which has been heated in a heating unit, which will be described later on, into a basket 13 of the percolator 2 to drip therefrom into a receptacle 14. A base portion 15 is attached to the columnar portion 10 and accommodates a flow-through heating unit 16 for heating the liquid. Since the base portion 15 is substantially perpendicular to the columnar portion 10 and horizontal, its upper surface may serve, as shown in the drawing, as a support surface for the receptacle 14. Preferably, the flow-through heater 16 is arranged within the base portion 15 in such a manner as to simultaneously serve for keeping the contents of the receptacle 14 warm. A cantilever portion 17 extends substantially perpendicularly to the columnar portion 10 in its upper region, and at least over a portion of the base portion 15. The cantilever portion 17 accommodates a substantially horizontal end portion 18 of the rising conduit 12, the end portion 18 being provided with an aperture 19 for discharge of the hot fluid into the percolator 2. The aperture is arranged in such a manner as to be located centrally of the basket 13 of the percolator 2 once the receptacle 14 thereof is properly situated on the base portion 15. The cantilever portion 17 and the upper portion of the columnar portion 10 are covered from above by a removable lid 20 so that the chamber 11 is fully closed with respect to the exterior of the apparatus but for orifices or slits serving for admission of air into the chamber 11 when the lid is in its proper position, but the chamber 11 can be filled with additional liquid once the lid 20 is removed.

A conduit 21 connects the storage chamber 11 with the flow-through heater 16 in which the liquid being supplied from the chamber 11 through the conduit 21 is heated to the temperature which is needed for preparation of a beverage, and from which the heated liquid is being forwarded into the rising conduit 12 and from there into the basket 13.

The flow-through heater 16 comprises a heater body 22 which may be produced as a die-cast or injection molded part which may be formed during the casting operation with a channel 23 for conducting the liquid to be heated through the flow-through heater 16. The heater body 22, which is shown in greater detail in FIGS. 2 to 4, is provided with an inlet nipple 24 having a port communicating with the channel 23 and with the conduit 21 from the storage chamber 11, and with an outlet nipple 24 having a port communicating with the channel 23 and with the rising conduit 12. The channel 23 extends along a substantially U-shaped path so that the outlet nipple 25 is located adjacent the inlet nipple 24, both nipples being oriented in the same direction. The body 22 is further provided with projections 26 laterally surrounding the nipples 24, 25 so that heat is transmitted from the projections 26 into the nipples 24, 25 and thus the liquid passing through the channel 23 is heated even while it passes through the nipples 24, 25.

Referring now particularly to FIG. 4, it may be seen therein that the channel 23 is subdivided into an inlet portion 27 and an outlet portion 28, the two portions 27 and 28 being located at different levels. Preferably, at least a part of the inlet portion 27 is located at a higher level than the outlet portion, the transition between the portions 27 and 28 being step-wise. Experience has shown that the most advantageous heating conditions prevail in the channel 23 if the length of the outlet portion 28 equals approximately 1.5 to 2 times the length of the inlet portion 27, the length of the latter amounting to substantially 45 millimeters and its cross-sectional area to approximately 80 mm$^2$. It is further advantageous if the outlet portion 28 of the channel 23 diverges in the direction toward the rising conduit 12.

It may best be seen in FIG. 2 that in the currently preferred embodiment of the invention the inlet portion 27 of the channel 23 is provided in the heater body 22 in such a manner that at least a portion thereof is open in the upward direction when considered in the mounted position of the flow-through heater 16. FIG. 2a shows a covering plate 29 which is to be assembled with the heater body 22 shown in FIG. 2 to form the flow-through heater 16. Considering the FIGS. 2 and 2a together, it may be seen that when the covering plate 29 is to be assembled with the heater body 22, the covering plate 29 is flipped over from the position shown in FIG. 2a and positioned on the heater body 22 so that an opening 30 in the covering plate 29 becomes coaxial with a bore 30' in the heater body 22, so that a screw or a similar fastener may be inserted into the opening 30 and threaded into the bore 30' so as to fasten the covering plate 29 to the heater body 22. The reason for making the channel 23 upwardly open is to render possible exact machining of the inlet portion 27 of the channel 23, which exact machining is of importance for the function of the inlet portion 27 which will be described later on, and to make the channel accessible after some period of operation of the apparatus, for instance, for cleaning purposes. In order to prevent the liquid passing through the channel 23 from escaping through the opening 30 or around the covering plate 29, an annular sealing element 31 is accommodated in a groove (not shown) provided in the covering plate 29, and similarly another sealing element 32 is provided in another groove (also not shown) of the covering plate 29 and surrounds the area in which the opening 30 is provided. It is to be understood that the grooves may alternatively be provided in the heater body 22 and the sealing elements 31, 32 may be accommodated in these grooves instead of being accommodated in the grooves of the covering plate 29. Advantageously, these sealing elements 31, 32 are of the deformable type, so that when the fastening means attaching the covering plate 29 to the heater body 22 is tightened, the sealing elements 31, 32 are deformed to such an extent that, while preventing the liquid from escaping, they do not prevent the lower surface of the covering plate 29 from abutting against the upper surface of the heater body 22 so that unimpeded heat exchange may take place between these two surfaces. It is advantageous if the thickness of the covering plate 29 is no less than 7 millimeters, so that not only the heater body 22 but also the covering plate 29 have high heat storage capacity. Preferably, the covering plate 29 is constructed as a plate covering the entire region of the heater body 22 in which the channel 23 is provided, and the heater body 22 is formed with a rim 33 which projects beyond the aforementioned surface of the heater body 22 in both the circumferential and the vertical directions. It is most advantageous if the vertical dimension by which the rim 33 projects beyond the surface at least substantially equals the thickness of the covering plate 29 since in that case the covering plate 29 is inserted into a recess defined by the rim 33 so as to be circumferentially surrounded by the same, and heat is transferred into the covering plate 29 from the rim 33.

In the preferred embodiment of the invention, a groove 34 extending substantially parallel to the channel 23 surrounding the same along a substantially U-shaped path is provided in the heater body 22, preferably in its lower region. An electric heating element 35 generating the required heat is located in the groove 34; preferably, the groove 34 is located at approximately the same level as the channel 23, so that the heat generated in the heating element 35 is transmitted to the channel 23 with minimum losses. The heating element 35 itself is of conventional design and is connectable to a source of electric energy in a known manner, a conventional thermostatic element being arranged in the circuit for controlling the delivery of the heat energy into the heating element 35.

Figure 5:
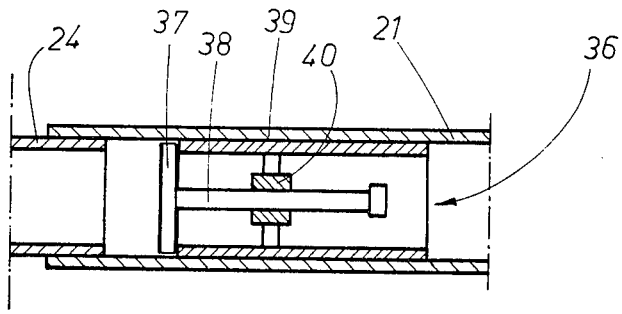
FIG. 5 is an enlarged cross-sectional view of a portion of the flow-through heater and of a conduit connected thereto with a one-way valve accommodated therein.

Finally, FIGS. 1 and 5 show that a one-way valve 36, which may be constructed as a disk valve, is accommodated in the conduit 21 between the storage chamber 11 and the inlet nipple 24 of the flow-through heater 16. The one-way valve 36 comprises a valve disk 37 opening in the direction toward the channel 23, a valve seat member 39 configurated as a sleeve fittingly insertable into the conduit 21, a valve stem 38 attached to the valve disk 37, and a slide bearing 40 connected to the valve seat member 39 and supporting the valve stem 38 for movement longitudinally of to valve seat member 39.

The operation of the apparatus is as follows: once the unheated liquid is introduced into the storage chamber 11, due to the principle of communicating vessels, it proceeds through the flow-through heater 16 until the surface of liquid in the rising conduit 12 levels with the surface in the storage vessel 11. The liquid passing through the heater may be heated even during this initial passage, but not necessarily so. If the flow-through heater is put into operation only after the storage container filling operation has been accomplished, the originally unheated water present in the rising conduit 12 is gradually heated once the flow-through heater 16 is put into operation due to the rising of the liquid present in the flow-through heater through the rising conduit 12 caused by the lower specific weight of heated liquid when compared with that of unheated liquid. During the operation of the flow-through heater 16, the liquid present in the channel 23 thereof is gradually heated with attendant generation of steam which is collected above the surface of the liquid in the inlet portion 27 of the channel 23 to form a steam cushion therein. As the steam cushion expands with attendant increase in pressure it exerts on the surface of the liquid present in the inlet portion 27, the one-way valve 36 becomes closed so that the heated liquid cannot escape into the storage chamber 11, and it proceeds from the inlet portion 27 into the outlet portion 28 and from there into the rising conduit 12 resulting in upward movement of the surface of hot liquid contained therein until the liquid is delivered to the outlet aperture 19 to emerge from the apparatus and flow into the basket 13 of the percolator 2. Since the inlet portion 27 of the channel 23 is located at a higher level than the outlet portion 28, the steam cushion remains practically stationary in the inlet portion 27 without any steam being entrained into the flow of liquid passing through the flow-through heater 16. Once a certain amount of liquid is forced out of the flow-through heater 16 by the action of the expanding steam cushion and a corresponding quantity of liquid exits from the aperture 19 into the percolator 2, the pressure relations in the one-way valve 36 are automatically reversed. This is due to the fact that the pressure which the hot liquid exerts on the one-way valve 36 gradually decreases as more and more liquid is pushed through the aperture 19, until this pressure drops below the pressure exerted on the one-way valve by the unheated liquid coming from the storage container 11, at which point the one-way valve 36 opens admitting additional quantity of unheated liquid into the channel 23. Once at least an incremental quantity of unheated liquid is admitted into the inlet portion 27 of the channel 23, the pressure-reversal process is further enhanced since the steam cushion collapses once the temperature of the liquid present in the inlet portion 27 is reduced by addition of the incremental amount of unheated liquid. The pressure equilibrium is established only after the surface in the rising conduit 12 levels off with the surface in the storage chamber 11, after which the entire process is repeated. While it is evident that the heating and forwarding process is not entirely continuous but rather results in a pulsating flow of liquid through the apparatus, the frequency of pulsation is such that the flow pattern of the hot liquid closely resembles a continuous flow, which is a result of the specific construction of the channel 23. The liquid which has been already heated in the inlet portion 27, is further heated in the outlet portion 28 of the channel 23 to a temperature just slightly below the boiling temperature of the liquid, so that no steam is generated in the outlet portion 28 and no interference of steam with the smooth flow of the hot liquid occurs, while the temperature of the hot liquid emerging from the outlet aperture 19 is almost equal to the boiling temperature.

It will be understood that each of the elements described above, or two or more together, may also find a useful application in other types of hot beverage producing apparatus differing from the type described above. So, for instance, the heating unit 1 may be of different construction, particularly with respect to the arrangement of the storage chamber, which may also be provided in a separate vessel insertable into the heating unit, and the configuration and arrangement of the rising conduit. Also, as already mentioned before, the percolator 2 may be substituted by a cup or a similar container if hot beverages or, for that matter, any other edible hot substances, such as soups, are to be prepared from instant mixtures or if the liquid filled into the chamber is already flavored. Furthermore, it is also possible to substitute a different one-way valve for that shown in the drawing and, if so desired, to provide biasing means controlling the opening of the valve. In addition thereto, it is also possible to form the channel 23 in a separate tubular element which then may be accommodated in the heater body 22 which for this purpose may be provided with a recess accepting the tubular body. If so desired, the channel may also be of a coiled or straight configuration depending on the available space and technological considerations, as long as it comprises an inlet portion which is at least partially located at a higher level than an inlet portion of the channel.

While the invention has been illustrated and described as embodied in apparatus for preparing hot beverages, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In an apparatus for preparing hot beverages, a combination comprising means defining a storage chamber for an unheated liquid; an upright rising conduit for conducting hot liquid; and a flow-through heater provided with a substantially horizontal channel for conducting the liquid from said storage chamber to said rising conduit, said channel including an unobstructed inlet portion having an inlet communicating with said storage chamber and an outlet, and an unobstructed outlet portion stepwise merging with said inlet portion and communicating with said outlet thereof and with said rising conduit, said inlet of said inlet portion being located at a higher level than said outlet of said inlet portion, the liquid being heated in said inlet portion to a temperature considerably below the boiling temperature of the liquid but with generation of steam at the walls bounding said inlet portion, which steam accumulates in a region of said inlet portion intermediate said inlet and outlet thereof and upwardly of said outlet of said inlet portion to form in said region a steam cushion which alternately expands and contracts in dependence on the temperature of the liquid in said inlet portion and thus pumps the partially heated liquid from said inlet portion into said outlet portion through said outlet without the steam simultaneously escaping from said region into said outlet with the partially heated liquid due to the relatively low temperature of the latter, the partially heated liquid being further heated in said outlet portion so as to elevate the temperature thereof to close below the boiling temperature of the liquid.

2. A combination as defined in claim 1, wherein said inlet and outlet portions are elongated, and wherein the length of said outlet portion amounts to substantially 1.5 to 2 times the length of said inlet portion.

3. A combination as defined in claim 1, wherein said channel is of a substantially U-shaped configuration, and wherein said flow-through heater is provided with an inlet nipple communicating with said inlet portion and an outlet nipple communicating with said outlet portion, said nipples being adjacent one another and oriented in the same direction.

4. A combination as defined in claim 1, wherein said heater has an upper surface, and wherein said inlet portion is formed so as to be at least in part open to said upper surface; and further comprising closure means attachable to said upper surface so as to cover said part of said inlet portion.

5. A combination as defined in claim 4, said closure means comprising a cover plate, and said heater having a rim defining a recess in said heater including said upper surface and extending over the entire region in which said channel is formed; and wherein said plate is insertable into said recess so as to abut against said surface and said rim and is attachable to said heater.

6. A combination as defined in claim 5, wherein said cover plate is attachable centrally of said heater; and wherein said closure means further comprises sealing means situated between said heater and said cover plate and surrounding said part of said inlet portion so as to prevent the liquid contained therein from escaping.

7. A combination as defined in claim 6, wherein said cover plate is formed with recess means adapted to accommodate said sealing means so as to permit abutment of said cover plate against said upper surface.

8. A combination as defined in claim 6, wherein said heater is formed with recess means adapted to accommodate said sealing means so as to permit abutment of said cover plate against said upper surface.

9. A combination as defined in claim 1, wherein said flow-through heater has a lower portion and is formed with a recess in said lower portion, said recess being located at substantially the same level as said channel surrounding the same; and further comprising a heating element insertable into said recess.

10. A combination as defined in claim 1, wherein said outlet portion diverges in the direction toward said rising conduit.

11. A combination as defined in claim 1, further comprising one-way valve means arranged between said storage chamber and said inlet portion and operative for controlling the flow of said unheated liquid into said inlet portion.

12. A combination as defined in claim 11, wherein said valve means is a disk valve having a valve disk opening in the direction toward said inlet portion and a valve stem attached to said valve disk.

13. A combination as defined in claim 12, further comprising a conduit connecting said storage chamber with said inlet portion; and wherein said valve means comprises valve seat means including a valve sleeve fittingly inserted into said conduit and a slide bearing coaxial with said valve sleeve and supporting said valve stem.

* * * * *